(12) United States Patent
Watanabe et al.

(10) Patent No.: US 6,307,642 B1
(45) Date of Patent: Oct. 23, 2001

(54) COMMUNICATION APPARATUS

(75) Inventors: Keiji Watanabe, Yamatokoriyama; Makoto Nakabayashi, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/129,094

(22) Filed: Aug. 5, 1998

(30) Foreign Application Priority Data

Sep. 10, 1997 (JP) .................................................. 9-245723

(51) Int. Cl.$^7$ ...................................................... B41B 19/00
(52) U.S. Cl. ........................... 358/1.15; 358/434; 358/436
(58) Field of Search ........................... 358/434, 435–439, 358/1.15, 405–407; 379/100

(56) References Cited

U.S. PATENT DOCUMENTS

| | | | | |
|---|---|---|---|---|
| 5,721,731 | * | 2/1998 | Yoshida ................................. | 370/296 |
| 5,812,281 | * | 9/1998 | Mukai et al. ......................... | 358/435 |
| 5,847,842 | * | 12/1998 | Maeda ................................... | 358/434 |
| 5,963,622 | * | 10/1999 | Walsh ................................. | 379/93.33 |
| 6,072,597 | * | 6/2000 | Yoshida ................................ | 358/435 |

FOREIGN PATENT DOCUMENTS

| | | | |
|---|---|---|---|
| A 7-298027 | 11/1995 | (JP) ................................. | H04N/1/32 |
| A 8-79483 | 3/1996 | (JP) ................................. | H04N/1/32 |
| A 8-214132 | 8/1996 | (JP) ................................. | H04N/1/32 |
| A 8-214136 | 8/1996 | (JP) ................................. | H04N/1/32 |

OTHER PUBLICATIONS

ITU–T Series T: Terminal Equipment and Protocols for Telematic Services (Jul. 1996).*

* cited by examiner

Primary Examiner—David Moore
Assistant Examiner—Kevin C Kianni

(57) ABSTRACT

An object of the invention is to prevent a communication error, which may occur as a JM signal or a CM signal is kept transmitted, thereby ensuring transmission and reception of desired data. When a communication apparatus, which has transmitted the JM signal, does not receive a CJ signal when a JM signal transmission time t3 elapses, the communication apparatus interrupts transmission of the JM signal and transmits a DIS with bit 6 set, and receives a CI, CJ, DCS or NSS to execute the protocol of Recommendation V.34 or T.30. When the communication apparatus, which has transmitted the CM signal, does not receive the JM signal when a CM signal transmission time t4 elapses, the communication apparatus interrupts transmission of the CM signal and transmits the CI signal, and receives an ANSam signal or a signal of a V.21 channel 2 to execute the protocol of Recommendation V.34 or T.30. When detecting the signal of the V.21 channel 2 within the CM signal transmission time t4, the communication apparatus interrupts transmission of the CM signal and receives the signal of the V.21 channel 2 to perform the protocol of Recommendation T.30.

4 Claims, 18 Drawing Sheets

FIG. 3

| Bit No. | CONTENT | Bit No. | CONTENT |
|---|---|---|---|
| 1~5 | Reserved | 29 | Reserved |
| 6 | V.8 Capabilities | 30 | Reserved |
| 7 | 0=256, 1=64 octets Preferred | 31 | T.6 coding capability |
| 8 | Reserved | 32 | Extend field |
| 9 | Ready to transmit a facsimile document | 33~39 | Reserved |
| | | 40 | Extend field |
| 10 | Receiver fax operation | 41 | R8×15.4 lines/mm |
| 11~14 | Data signalling rate | 42 | 300×300 pels/25.4mm |
| 15 | R8×7.7 lines/mm and/or 200×200 pels/25.4mm | 43 | R16×15.4 lines/mm and/or 400×400 pels/25.4mm |
| 16 | Two dimensional coding capability | 44 | Inch based resolution preferred |
| 17,18 | Recoding width capabilities | 45 | Metric based resolution preferred |
| 19,20 | Maximum recoding length capability | 46 | Minimum scan line time capability for higher resolutions |
| 21~23 | Minimum scan line time capability at the receiver | 47 | Selective polling |
| 24 | Extend field | 48 | Extend Field |
| 25 | Reserved | — | — |
| 26 | Uncompressed mode | — | — |
| 27 | Error correction mode | — | — |
| 28 | Set to "0" | | |

FIG. 4

| Bit No. | CONTENT | Bit No. | CONTENT |
|---|---|---|---|
| 49 | Subaddressing capability | 68 | JPEG coding |
| 50 | Password | 69 | Full colour mode |
| 51 | Ready to transmit a data file | 70 | Set to "0" |
| 52 | Reserved | 71 | 12 bits/pel component |
| 53 | Binary file transfer (BFT) | 72 | Extend field |
| 54 | Document transfer mode (DTM) | 73 | No subsampling (1:1:1) |
| 55 | Electronic data interchange (EDI) | 74 | Custom illuminant |
| 56 | Extend field | 75 | Custom gamut range |
| 57 | Basic transfer mode (BTM) | 76 | North American Letter (215.9× 279.4mm) capability |
| 58 | Reserved | 77 | North American Legal (215.9× 355.6mm) capability |
| 59 | Ready to Transmit a character or mixed mode document (polling) | 78 | Single-progression sequential coding (T.85) basic capability |
| 60 | Character mode | 79 | Single-progression sequential coding (T.85) optional L0 capability |
| 61 | Reserved | 80 | Extend field |
| 62 | Mixed mode (Annex E/T.4) | — | — |
| 63 | Reserved | — | — |
| 64 | Extend field | — | — |
| 65 | Processable mode 26 (T.505) | | |
| 66 | Digital network capability | | |
| 67 | Full and half duplex capability | | |

COMMUNICATION APPARATUS

BACKGROUND OF THE INVENTION

1. Field of the Invention

The present invention relates to a communication apparatus, for example, a facsimile machine, which executes communication according to the protocols that are defined by Recommendations T.30, V.8 and V.34 of the ITU-T (International Telecommunication Union for Telecommunications).

2. Description of the Related Art

Recommendation T.30 of the ITU-T defines a protocol for transmitting text via facsimile over a public switched telephone network(PSTN), Recommendation V.8 specifies a session start protocol for data transmission over the PSTN, and Recommendation V.34 defines the specifications of a modem which operates at a data signal rate of up to 33600 bps that is used in the PSTN and a 2-wire, point-to-point telephone-type private line.

FIG. 13 is a diagram showing a protocol signal in a communication apparatus according to first prior art. Here, a calling station and a called station are both operable according to the protocols of Recommendations T.30, V.8 and V.34 of the ITU-T. After a line connection between the calling station and called station is established, the called station transmits a modulated answer tone signal(ANSam). Upon reception of the ANSam signal, the calling station transmits a calling menu signal(CM signal). When the called station receives the CM signal within a predetermined ANSam transmission time t1 defined by Recommendation V.8, the called station transmits a common menu signal(JM signal). A modulation mode between the calling station and the called station is determined by exchanging the CM signal and the JM signal. Upon reception of the JM signal, the calling station transmits a calling menu end signal(CJ signal), which is in turn received by the called station. After the calling station and called station complete the protocol of Recommendation V.8, the protocol of Recommendation V.34 is carried out.

FIG. 14 is a diagram showing a protocol signal in a communication apparatus according to second prior art. In this prior art, a calling station and a called station can also operate according to the protocols of Recommendations T.30, V.8 and V.34. After a line connection between the calling station and called station is established, the called station transmits an ANSam signal. When the calling station does not receive the ANSam signal and thus transmits no CM signal, the called station cannot receive the CM signal within the predetermined ANSam transmission time t1. At this time, the called station interrupts transmission of the ANSam signal and transmits a digital identification signal (DIS) in which bit 6 is set, i.e., bit 6=1. Upon reception of the DIS, the calling station transmits a calling indication signal(CI signal). When receiving the CI signal, the called station transmits the ANSam signal. After the calling station receives the ANSam signal, the protocols of Recommendations V.8 and V.34 are executed as illustrated in FIG. 13.

FIG. 15 is a diagram showing a protocol signal in a communication apparatus according to third prior art. Here, a called station can operate according to the protocols of Recommendations T.30, V.8 and V.34, while a calling station can operate according only to the protocol of Recommendation T.30. After a line connection between the calling station and called station is established, the called station transmits an ANSam signal. When the calling station does not receive the ANSam signal and thus transmits no CM signal, the called station cannot receive the CM signal within the predetermined ANSam transmission time t1. At this time, the called station interrupts transmission of the ANSam signal and transmits a DIS with bit 6 set. Upon reception of the DIS, the calling station transmits a digital command signal(DCS) or a non-standard facilities set-up signal(NSS), and the called station receives the DCS or NSS. In this manner, the calling station and the called station execute the protocol of Recommendation T. 30.

FIG. 16 is a diagram showing a protocol signal in a communication apparatus according to fourth prior art. Here, a called station is operable according only to the protocol of Recommendation T.30, while a calling station is operable according to the protocols of Recommendations T.30, V.8 and V.34. After a line connection between the calling station and called station is established, the called station transmits an answer tone signal(ANS signal). The calling station does not receive the ANS signal and does not therefore transmit a CM signal. The called station transmits the ANS signal for a predetermined ANS transmission time t2 defined by Recommendation V.25, and then transmits a DIS with bit 6 reset, i.e., a DIS with bit 6=0. The calling station, when receiving the DIS, transmits a DCS or NSS, and the called station receives the DCS or NSS. In this manner, the calling station and the called station execute the protocol of Recommendation T.30.

Some examples of such communication apparatuses are disclosed in, for example, Japanese Unexamined Patent Publications JP-A 8-79483 (1996), 7-298027 and 8-214132 (1996). In JP-A 8-79483, a communication apparatus operable according to the protocol of Recommendation V.8 is permitted to receive data both from a station which is operable according to the protocol of Recommendation V.8 and a station which is operable according to the protocol of Recommendation T.30 in the following manner. When receiving the CM signal within the ANSam transmission time t1, the apparatus transmits the JM signal to execute the protocol of Recommendation V.8. When the apparatus cannot receive the CM signal within the ANSam transmission time t1, on the other hand, the apparatus transmits an nonstandard facilities signal(NSF signal), a called subscriber identification signal(CSI signal) and DIS, and upon reception of the CM signal thereafter, the apparatus transmits the JM signal and then executes the protocol of Recommendation V.8, while upon reception of the NSS, transmitting subscriber identification signal(TSI signal) and DCS, the apparatus executes the protocol of Recommendation T.30.

In Japanese Unexamined Patent Publication JP-A 7-298027 (1995), in order to enable a subscriber terminal operative according to the protocol of Recommendation V.8 and a subscriber terminal inoperative according to the protocol of Recommendation V.8 to communicate with each other, a communication apparatus operative according to the protocol of Recommendation V.8 transmits a CI signal after transmission of a calling tone signal(CNG signal), and thereafter upon reception of an AI signal or ANSam signal, executes the protocol of Recommendation V.8 after transmission of the CM signal, whereas when receiving the NSF, CSI and DISs, the apparatus executes the protocol of Recommendation T.30 after transmission of the NSS, TSI and DCS. Further, in JP-A 8-214132 (1996), to effectively utilize Recommendation V.8, the communication apparatus transmits the CM signal upon reception of the ANSam signal from a called station, and transmits the CJ signal upon reception of the JM signal from the called station.

Japanese Unexamined Patent Publication JP-A 8-214136 (1996) discloses that when a transmitting subscriber terminal can not receive a JM signal from a called station during a predetermined period of transmission of a CM signal, the transmitting subscriber terminal executes switching among transmission modes so that the JM signal is received in the half duplex transmission mode after transmission of the CM signal and in the case where a CJ signal is transmitted after reception of a JM signal at a calling station a called subscriber terminal executes switching among transmission modes, when the CM and CJ signals can not be received during transmission of the JM signal, so that the transmission period of the JM signal is extended and the CJ signal from the calling subscriber terminal is received in the half duplex transmission mode.

FIG. 17 is a diagram depicting a protocol signal for the conventional communication apparatuses when a communication error occurs. When a calling station can not receive the ANSam signal which has been transmitted from a called station, the calling station does not transmit the CM signal and waits for the ANSam signal or DIS. When the called station erroneously acknowledges that it has received the CM signal, the called station transmits the JM signal. As the calling station is waiting for the ANSam signal or DIS, the calling station does not receive the JM signal and thus transmits no CJ signal. Consequently, the called station cannot receive the CJ signal and thus keeps transmission of the JM signal. When a predetermined signal transmission time T1 defined by Recommendation T.30 passes, the calling station recognizes it as a communication error and terminates the communication. When the called station does not receive the CJ signal within the signal transmission time T1, the called station interrupts transmission of the JM signal, determines that a communication error has occurred, and terminates the communication. This undesirably disables transmission and reception of desired data.

FIG. 18 is a diagram depicting a protocol signal for conventional communication apparatuses when another communication error occurs. Upon reception of the ANSam signal from a called station, a calling station transmits the CM signal. The calling station keeps transmission of the CM signal until the calling station receives the JM signal from the called station. When the calling station does not receive the JM signal then, the calling station determines it as a communication error, and terminates the communication.

This will be discussed specifically. In the case where the called station is inoperable according to the V.8 protocol, when the called station transmits the ANS signal and the calling station mistakes the ANS signal received for the ANSam signal, the calling station transmits the CM signal, as shown in FIG. 18. The CM signal is continuously transmitted until the calling station receives the JM signal. Meanwhile, however, the called station transmits the ANS signal for the ANS transmission time t2, and then transmits the DIS with the bit 6 reset. Thereafter, when the called station does not receive a signal (flag) of the channel 2 of the V.21 within a predetermined time T4, which is defined by Recommendation T.30, the called station transmits the DIS again, and repeats the transmission of the DIS within the signal transmission time T1 until the called station receives an effective signal of the V.21 channel 2. As the calling station is transmitting the CM signal, however, the signal transmission time T1 will elapse without the called station receiving the effective signal of the V.21 channel 2. Accordingly, the called station determines that a communication error has occurred, and terminates the communication. Undesirably, therefore, transmission and reception of desired data cannot be accomplished.

SUMMARY OF THE INVENTION

Accordingly, it is an object of the present invention to provide a communication apparatus capable of preventing a communication error which occurs as a JM signal or CM signal is continuously transmitted, thereby ensuring transmission and reception of desired data.

The invention provides a communication apparatus capable of communicating with a destination communication apparatus according to protocols of Recommendations T.30, V.8 and V.34 of the ITU-T comprising:

detecting means for establishing a line connection to a calling station with the communication apparatus serving as a called station, and detecting a calling menu end signal(CJ signal) from the calling station within a predetermined transmission time for a common menu signal (JM signal) transmitted from the communication apparatus;

means for interrupting transmission of the JM signal when the CJ signal is not detected within the predetermined JM signal transmission time;

means for transmitting a digital identification signal(DIS) with bit number 6 set, after interrupting the transmission of the JM signal;

means for receiving a digital command signal(DCS) or non-standard facilities command signal(NSS) from the calling station after transmission of the DIS; and means for executing a protocol according to Recommendation T.30 after reception of the DCS or NSS.

According to the invention, the communication apparatus of the invention which serves as a called station transmits the JM signal after a line connection to a calling station is established. When the CJ signal from the calling station is not detected within the predetermined JM signal transmission time even though the JM signal has been transmitted, the communication apparatus interrupts transmission of the JM signal. Then, the communication apparatus transmits the DIS with bit 6 set. Further, the communication apparatus receives the DCS or NSS from the calling station. Then, the communication apparatus executes the protocol of Recommendation T.30. It is therefore possible to prevent a communication error which would otherwise occur by the continuous transmission of the JM signal, and to ensure transmission and reception of desired data.

This communication apparatus may further comprise:

means for receiving a CI signal from the calling station after transmission of the DIS signal; and means for transmitting an ANSam signal after reception of the CI signal to thereby execute a protocol according to Recommendation V.34.

According to the invention, when the CJ signal is not detected within the JM signal transmission time albeit the JM signal has been transmitted, the communication apparatus interrupts transmission of the JM signal and transmits the DIS signal with bit 6 set. Further, when receiving the CI signal from the calling station, the communication apparatus transmits the ANSam signal. Executing the protocol of Recommendation V.34 in this manner can prevent a communication error which would otherwise be caused by the continuous transmission of the JM signal, and can thus ensure transmission and reception of desired data.

This communication apparatus may further comprise:

means for receiving a CM signal from the calling station after transmission of the DIS; and means for transmitting the JM signal after reception of the CM signal to thereby execute a protocol according to Recommendation V.34.

According to the invention, when the CJ signal is not detected within the JM signal transmission time even though the JM signal has been transmitted, the communication apparatus interrupts transmission of the JM signal and transmits the DIS with bit 6 set. Further, when receiving the CM signal from the calling station, the communication apparatus transmits the JM signal. Executing the protocol of Recommendation V.34 in this manner can prevent a communication error, which would otherwise be caused by the continuous transmission of the JM signal, thereby ensuring transmission and reception of desired data.

The invention provides a communication apparatus capable of communicating with a destination communication apparatus according to protocols of Recommendations T.30, V.8 and V.34 of the ITU-T comprising:

detecting means for establishing a line connection to a called station with the communication apparatus serving as a calling station, and detecting a JM signal from the called station within a predetermined transmission time for a CM signal transmitted from the communication apparatus;

means for interrupting transmission of the CM signal when the JM signal is not detected within the CM signal transmission time;

means for receiving an ANSam signal or a signal of V.21 channel 2 from the called station after transmission of the CM signal is interrupted;

means for executing a protocol according to Recommendation V.34 by transmitting the CM signal after reception of the ANSam signal; and means for executing a protocol according to Recommendation T.30 after reception of the signal of the V.21 channel 2.

According to the invention, the communication apparatus which serves as a calling station transmits the CM signal after establishing a line connection to a called station. When the JM signal from the called station is not detected within the predetermined CM signal transmission time albeit the CM signal has been transmitted, the communication apparatus interrupts transmission of the CM signal. Then, the communication apparatus receives the ANSam signal or the signal of the V.21 channel 2 from the called station. Upon reception of the ANSam signal, the communication apparatus retransmits the CM signal to execute the protocol of Recommendation V.34. Upon reception of the signal of the V.21 channel 2, the communication apparatus executes the protocol of Recommendation T.30. It is therefore possible to prevent a communication error, which would otherwise occur by the continuous transmission of the CM signal, to thereby transmit and receive desired data.

The invention provides a communication apparatus capable of communicating with a destination communication apparatus according to protocols of Recommendations T.30, V.8 and V.34 of the ITU-T comprising:

detecting means for establishing a line connection to a called station with the communication apparatus serving as a calling station, and detecting a JM signal from the called station within a predetermined transmission time for a CM signal transmitted from the communication apparatus;

means for interrupting transmission of the CM signal when the JM signal is not detected within the CM signal transmission time;

means for transmitting a CI signal after transmission of the CM signal is interrupted;

means for receiving an ANSam signal or a signal of V.21 channel 2 from the called station after transmission of the CI signal;

means for executing a protocol according to Recommendation V.34 by transmitting the CM signal after reception of the ANSam signal; and means for executing a protocol according to Recommendation T.30 after reception of the signal of the V.21 channel 2.

According to the invention, the communication apparatus of the invention which serves as a calling station transmits the CM signal after a line connection to a called station is established. When the JM signal from the called station is not detected within the CM signal transmission time although the CM signal has been transmitted, the communication apparatus interrupts transmission of the CM signal and transmits the CI signal. Then, the communication apparatus receives the ANSam signal or the signal of the V.21 channel 2 from the called station. Upon reception of the ANSam signal, the communication apparatus retransmits the CM signal to execute the protocol of Recommendation V.34. Upon reception of the signal of the V.21 channel 2, the communication apparatus executes the protocol of Recommendation T.30. This can prevent a communication error, which would otherwise be caused by the continuous transmission of the CM signal, to thereby ensure transmission and reception of desired data.

The invention provides a communication apparatus capable of communicating with a destination communication apparatus according to protocols of Recommendations T.30, V.8 and V.34 of the ITU-T comprising:

detecting means for establishing a line connection to a called station with the communication apparatus serving as a calling station, and detecting a signal of a V.21 channel 2 from the called station within a predetermined transmission time for a CM signal transmitted from the communication apparatus;

means for interrupting transmission of the CM signal when the signal of the V.21 channel 2 is detected within the CM signal transmission time;

means for receiving the signal of V.21 channel 2 from the called station after transmission of the CM signal is interrupted; and means for executing a protocol according to Recommendation T.30 after reception of the signal of the V.21 channel 2.

According to the invention, the communication apparatus which serves as a calling station transmits the CM signal after a line connection to a called station is established. Upon detection of the signal of the V.21 channel 2 from the called station within the CM signal transmission time, the communication apparatus interrupts transmission of the CM signal and receives the signal of the V.21 channel 2. The communication apparatus executes the protocol of Recommendation T.30 in this manner. It is therefore possible to prevent a communication error, which would otherwise be caused by the continuous transmission of the CM signal, to thereby ensure transmission and reception of desired data.

BRIEF DESCRIPTION OF THE DRAWINGS

Other and further objects, features, and advantages of the invention will be more explicit from the following detailed description taken with reference to the drawings wherein:

FIG. 3 is a diagram showing a DIS;

FIG. 4 is a diagram showing the DIS;

DETAILED DESCRIPTION OF THE PREFERRED EMBODIMENTS

Figure 1:
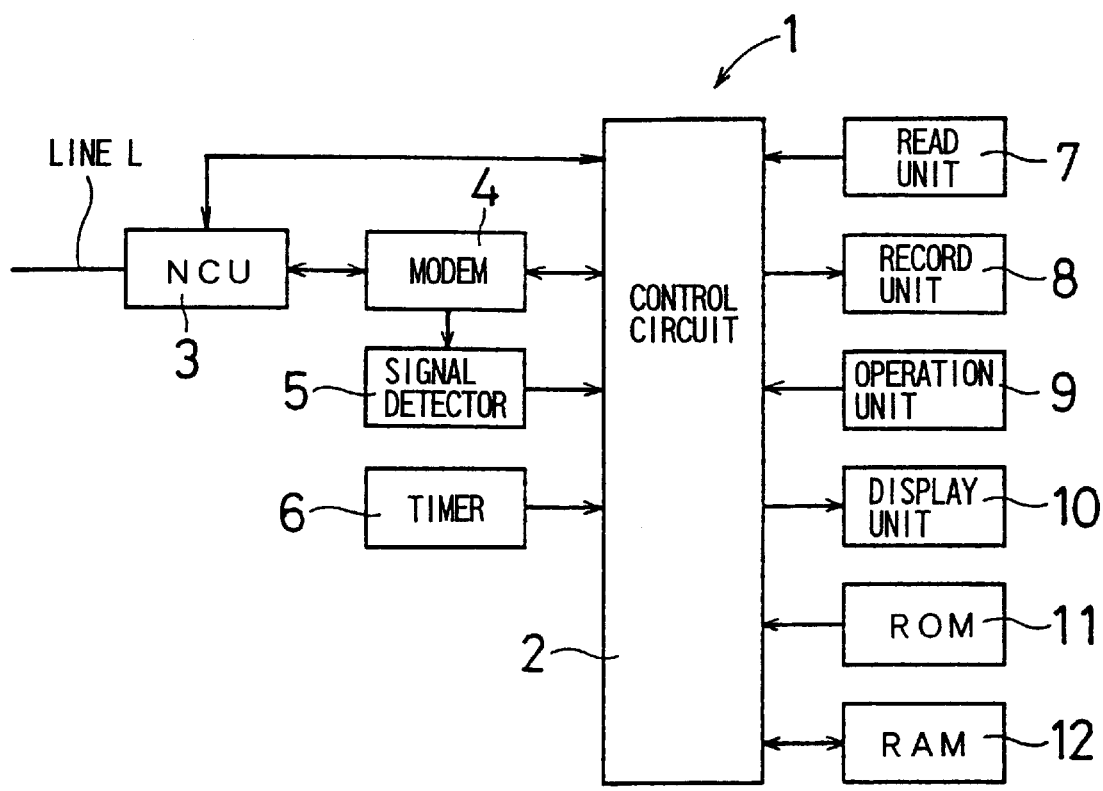
FIG. 1 is a block diagram showing the electric structure of a communication apparatus 1 according to one embodiment of the invention.

Now referring to the drawings, preferred embodiments of the invention are described below.

FIG. 1 presents a block diagram showing the electric structure of a communication apparatus 1 according to one embodiment of the invention. This communication apparatus 1 communicates with a destination communication apparatus according to the protocols of Recommendations T.30, V.8 and V.34 of the ITU-T. A control circuit 2, which may be comprised of a CPU (Central Processing Unit), controls the operations of an NCU (Network Control Unit) 3, a modem 4, a signal detector 5, a timer 6, a read unit 7, a record unit 8, an operation unit 9 and a display unit 10, all connected to the control circuit 2, in accordance with a program which is stored in a ROM (Read Only Memory) 11 to control the operation of the entire apparatus. A RAM (Random Access Memory) 12 temporarily stores various kinds of information for operational control. The NCU 3 controls a connection to a communication line L like a public switched telephone network (PSTN), as well as transmits a dial pulse corresponding to a destination communication apparatus and detects an incoming signal. Transmission data, modulated by the modem 4, is supplied to the NCU 3, and data received by the NCU 3 is given to the modem 4 to be demodulated.

The signal detector 5 detects various sorts of protocol signals from received data supplied to the modem 4 and gives the detection result to the control circuit 2. The control circuit 2 controls the operation of the modem 4 based on the detection result. Specifically, after establishing a line connection between the communication apparatus 1 as a called station and a calling station, the signal detector 5 detects a CJ signal from the calling station within a transmission time t3 for a JM signal which has been transmitted from the communication apparatus 1. The JM signal transmission time t3 is set to a time needed to transmit the JM signal for a predetermined time, or to transmit a predetermined number of JM signals, after the transmission of the JM signal has begun. When a CJ signal is not detected within the JM signal transmission time t3, the control circuit 2 controls the modem 4 in such a way as to interrupt transmission of the JM signal, transmit a DIS with bit 6 set, and transmit a protocol signal according to the protocol of Recommendation V.34 protocol or T.30 in a manner discussed later.

Further, after establishing a line connection between the communication apparatus 1 as a calling station and a called station, the signal detector 5 detects the JM signal from the destination communication apparatus within a transmission time t4 for the CM signal which has been transmitted from the communication apparatus 1. The CM signal transmission time t4 is set to a time needed to transmit the CM signal for a predetermined time, or to transmit a predetermined number of CM signals, after the transmission of the CM signal has started. When the JM signal is not detected within the CM signal transmission time t4, the control circuit 2 controls the modem 4 in such a way as to interrupt transmission of the CM signal, and transmit a protocol signal according to the protocol of Recommendation V.34 or T.30 in a manner discussed later.

The timer 6 measures the ANSam transmission time t1, the ANS transmission time t2, the predetermined signal transmission time T1 defined by Recommendation T.30 and the predetermined time T4 defined by Recommendation T.30, in addition to the JM signal transmission time t3 and the CM signal transmission time t4.

The communication apparatus 1 according to this embodiment has a facsimile function and the read unit 7 reads an image on an original. The record unit 8 prints and records received image data or image data, read by the read unit 7, on a predetermined recording sheet. The operation unit 9 has dial keys for input a telephone number for specifying the destination communication apparatus, and a start key for initiating the operation of the facsimile communication. The display unit 10 displays various kinds of information.

Figure 2:
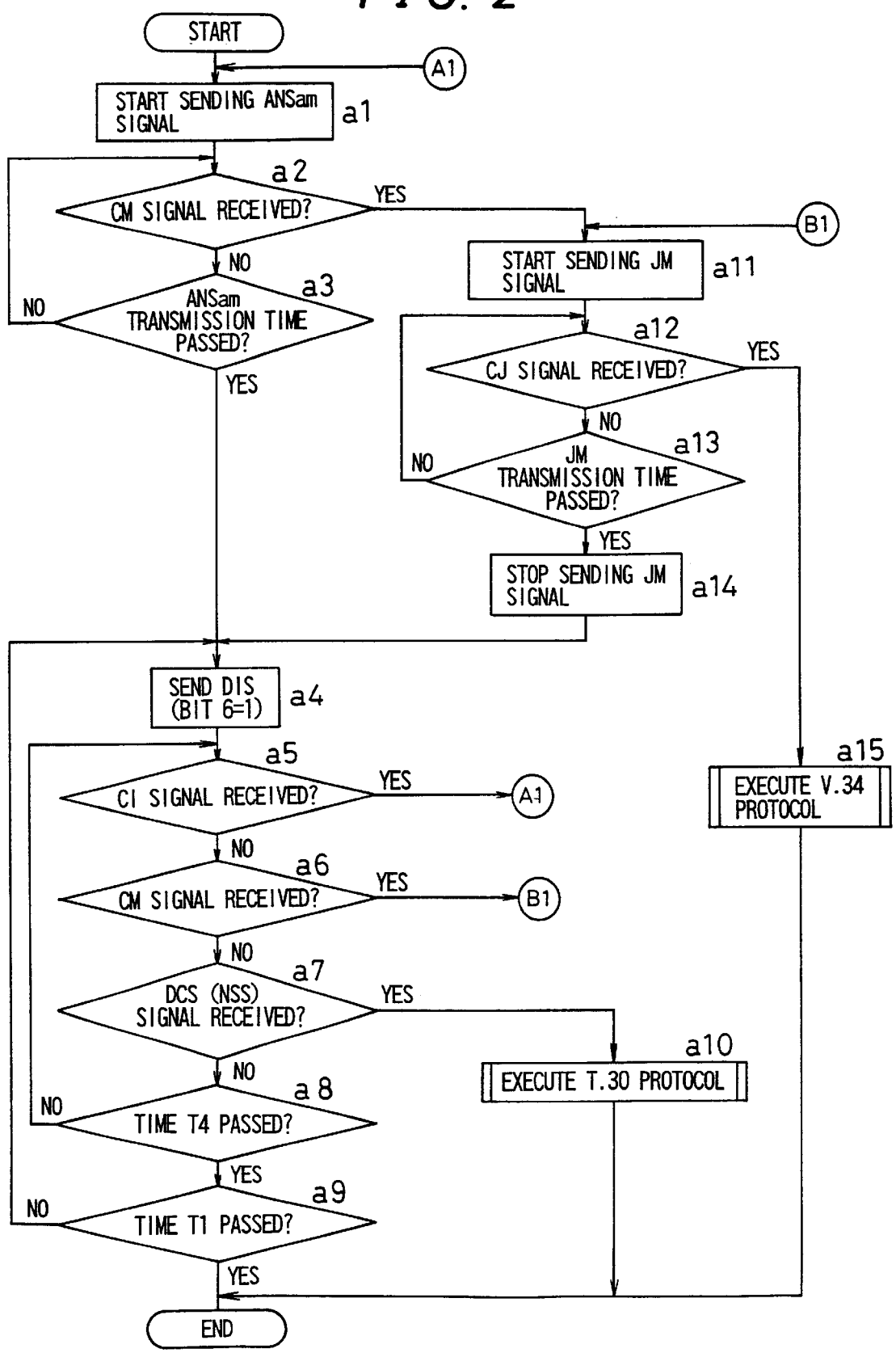
FIG. 2 is a flowchart for explaining the communication operation of the communication apparatus 1 serving as a called station.

FIG. 2 is a flowchart for explaining the communication operation of the communication apparatus 1 serving as a called station. In step a1 which follows the establishment of the connection of the line L between the communication apparatus 1 and a destination communication apparatus, transmission of the ANSam signal starts. In step a2, it is determined if the CM signal has been received. The flow proceeds to step a11 when the CM signal has been received, and the flow goes to step a3 when the CM signal has not been received yet. In step a2, the timer 6 measures the predetermined ANSam transmission time t1 specified by Recommendation V.8 besides the determination on the reception of the CM signal. The processes in steps a2 and a3 are repeated until the ANSam transmission time t1 elapses in step a3. When the ANSam transmission time t1 passes, the flow proceeds to step a4. After the elapse of the ANSam transmission time t1 in step a3, the timer 6 measures the predetermined signal transmission time T1 specified by Recommendation T.30.

In step a4, the DIS with bit 6 set as shown in FIGS. 3 and 4 is transmitted out, after which the flow goes to step a5. After the transmission of the DIS in step a4, the timer 6 measures the predetermined time T4 defined by Recommendation T.30. In step a5, it is determined if the CI signal has been received. The flow returns to step a1 when the CI signal has been received, and the flow goes to step a6 when the CI signal has not been received yet. It is determined in step a6 if the CM signal has been received. The flow proceeds to step a11 when the CM signal has been received, and the flow goes to step a7 when the CM signal has not been received yet. In step a7, it is determined if the DCS or NSS has been received. When such a signal has been received, the flow goes to step a10 where the protocol of Recommendation T.30 is executed after which the communication operation is terminated. When the DCS or NSS has not been received yet, on the other hand, the flow proceeds to step a8. The processes in steps a5 to a8 are repeated until the time T4 elapses in step a8. When the time T4 passes, the flow proceeds to step a9. The processes in steps a4 to a9 are repeated until the signal transmission time T1 elapses in step a9. When the signal transmission time T1 passes, the communication operation is terminated.

In step a11, transmission of the JM signal starts after which the flow goes to step a12. Note that in step a11, after transmission of the JM signal has begun, the timer 6 measures the JM signal transmission time t3. In step a12, it is determined if the CJ signal has been received. When the CJ signal has been received, the flow proceeds to step a15 to execute the protocol of Recommendation V.34 after which the communication operation will be terminated. When the CJ signal has not been received yet, the flow proceeds to step a13. The processes in steps a12 and a13 are repeated until the JM signal transmission time t3 elapses in step a13. When the JM signal transmission time t3 passes, the flow proceeds to step a14 to interrupt transmission of the JM signal after which the flow returns to step a4.

Figure 5:
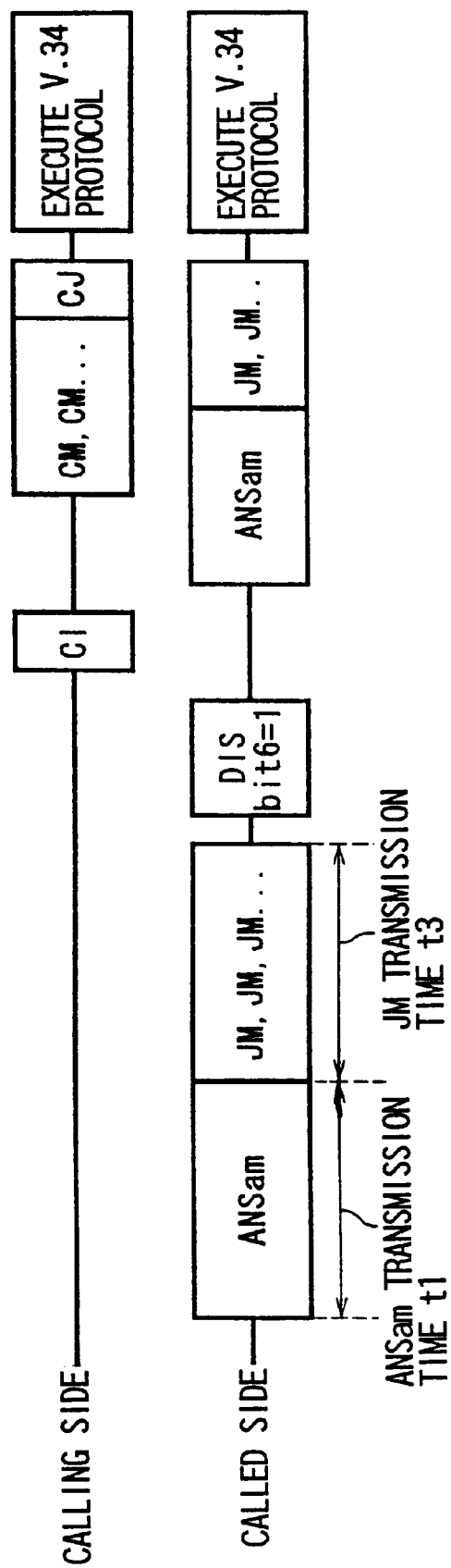
FIG. 5 is a diagram exemplifying a protocol signal when the communication apparatus 1 as a called station communicates with a calling station which can communicate according to the protocol of Recommendation V.8.

FIG. 5 is a diagram exemplifying a protocol signal when the communication apparatus 1 as a called station communicates with a calling station which can communicate according to the protocol of Recommendation V.8. In the case where the calling station cannot receive the ANSam signal which has been transmitted from the communication apparatus 1 as a called station so that the calling station does not transmit the CM signal, when the communication apparatus 1 erroneously acknowledges that the communication apparatus 1 has received the CM signal, the communication apparatus 1 transmits the JM signal. As the calling station is waiting for the ANSam signal or DIS, however, the calling station is unable to receive the JM signal and thus transmits no CJ signal. Consequently, the JM signal transmission time t3 will elapse. The communication apparatus 1 interrupts transmission of the JM signal and transmits the DIS with bit 6 set. The calling station which has received the DIS transmits the CI signal when acknowledging that the communication apparatus 1 has the V.8 capability. The communication apparatus 1 receives the CI signal and transmits the ANSam signal to redo the protocol of Recommendation V.8 to thereby execute the protocol of Recommendation V.34.

Figure 6:
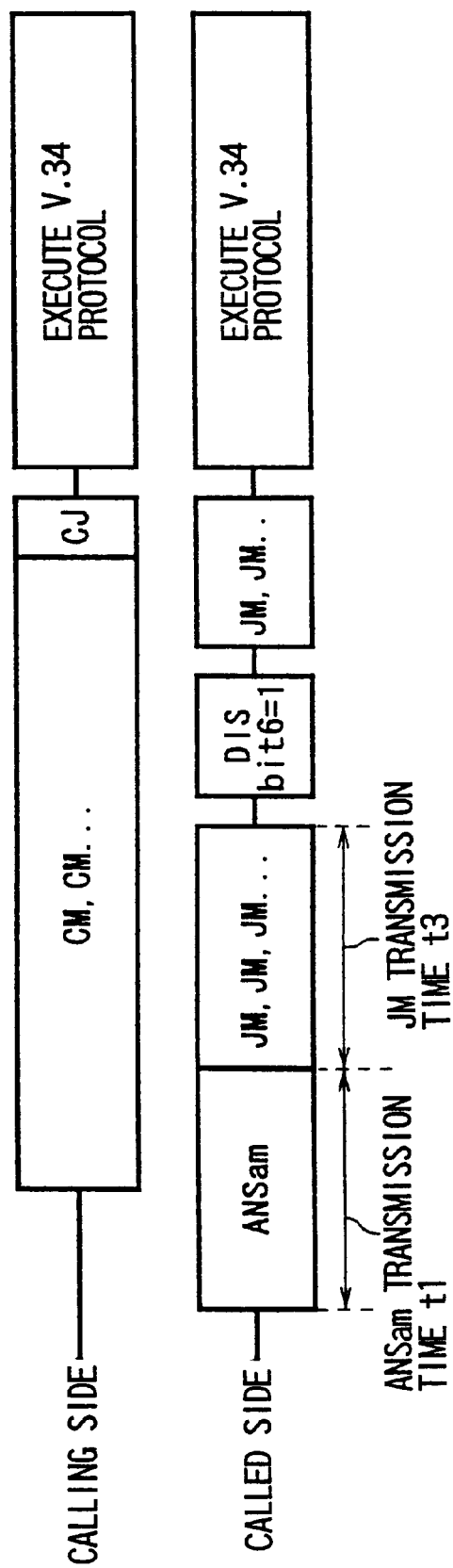
FIG. 6 is a diagram depicting another example of a protocol signal when the communication apparatus 1 as a called station communicates with a calling station which can communicate according to the protocol of Recommendation V.8.

FIG. 6 is a diagram depicting another example of a protocol signal when the communication apparatus 1 as a called station communicates with a calling station which can communicate according to the protocol of Recommendation V.8. When the calling station receives the ANSam signal which has been transmitted from the communication apparatus 1 as a called station, the calling station transmits the CM signal. The communication apparatus 1 receives the CM signal and transmits the JM signal. When the calling station is unable to receive the JM signal, the CJ signal is not transmitted so that the JM signal transmission time t3 will pass. The communication apparatus 1 interrupts transmission of the JM signal and transmits the DIS with bit 6 set. As the calling station keeps transmission of the CM signal until it receives the JM signal, the communication apparatus 1 receives the CM signal and transmits the JM signal. Accordingly, the protocol of Recommendation V.8 is retried to execute the protocol of Recommendation V.34.

Figure 7:
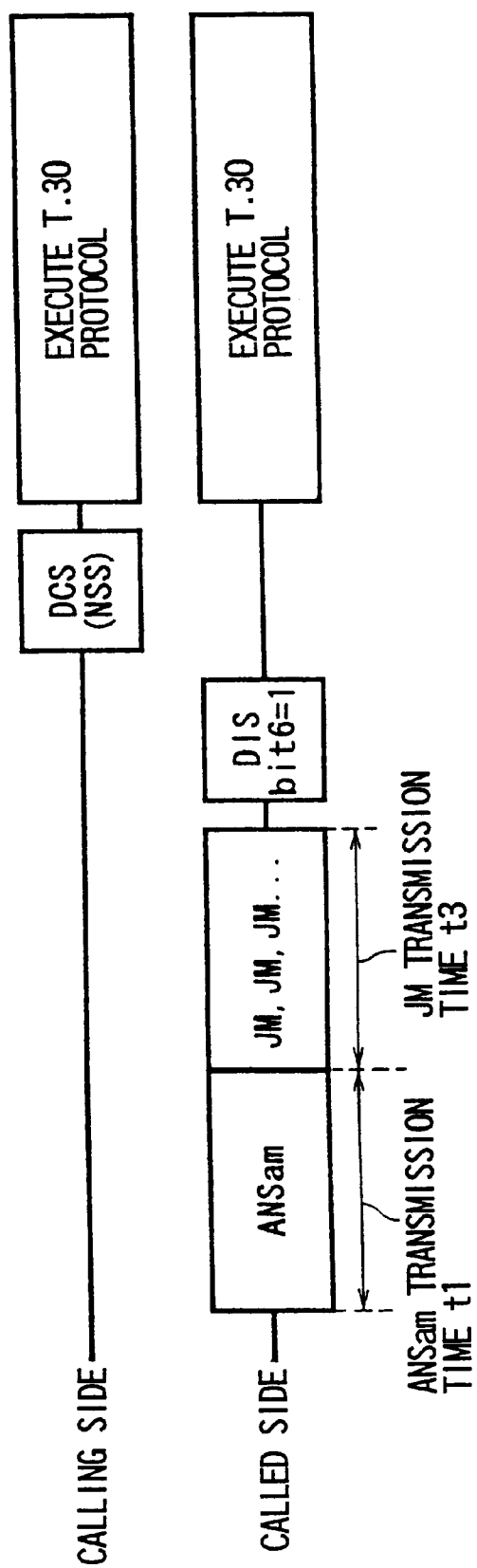
FIG. 7 is a diagram exemplifying a protocol signal when the communication apparatus 1 as a called station communicates with a calling station which cannot communicate according to the protocol of Recommendation V.8.

FIG. 7 is a diagram exemplifying a protocol signal when the communication apparatus 1 as a called station communicates with a calling station which can not communicate according to the protocol of Recommendation V.8. After the calling station receives the ANSam signal transmitted from the communication apparatus 1 as a called station, the calling station, which is not capable of communicating according to the protocol of Recommendation V.8, does not transmit the CM signal. When the communication apparatus 1 erroneously acknowledges that the communication apparatus 1 has received the CM signal, the communication apparatus 1 transmits the JM signal. As the calling station is waiting for the DIS according to Recommendation T.30, however, the calling station does not transmit the CJ signal, so that the JM signal transmission time t3 will elapse. The communication apparatus 1 interrupts transmission of the JM signal and transmits the DIS with bit 6 set. The calling station which has received the DIS transmits the DCS or NSS. Upon reception of the DCS or NSS, the communication apparatus 1 executes the protocol of Recommendation T.30.

It is therefore possible to prevent a communication error, which would otherwise be caused by the continuous transmission of the JM signal, thereby ensuring transmission and reception of desired data.

Figure 8:
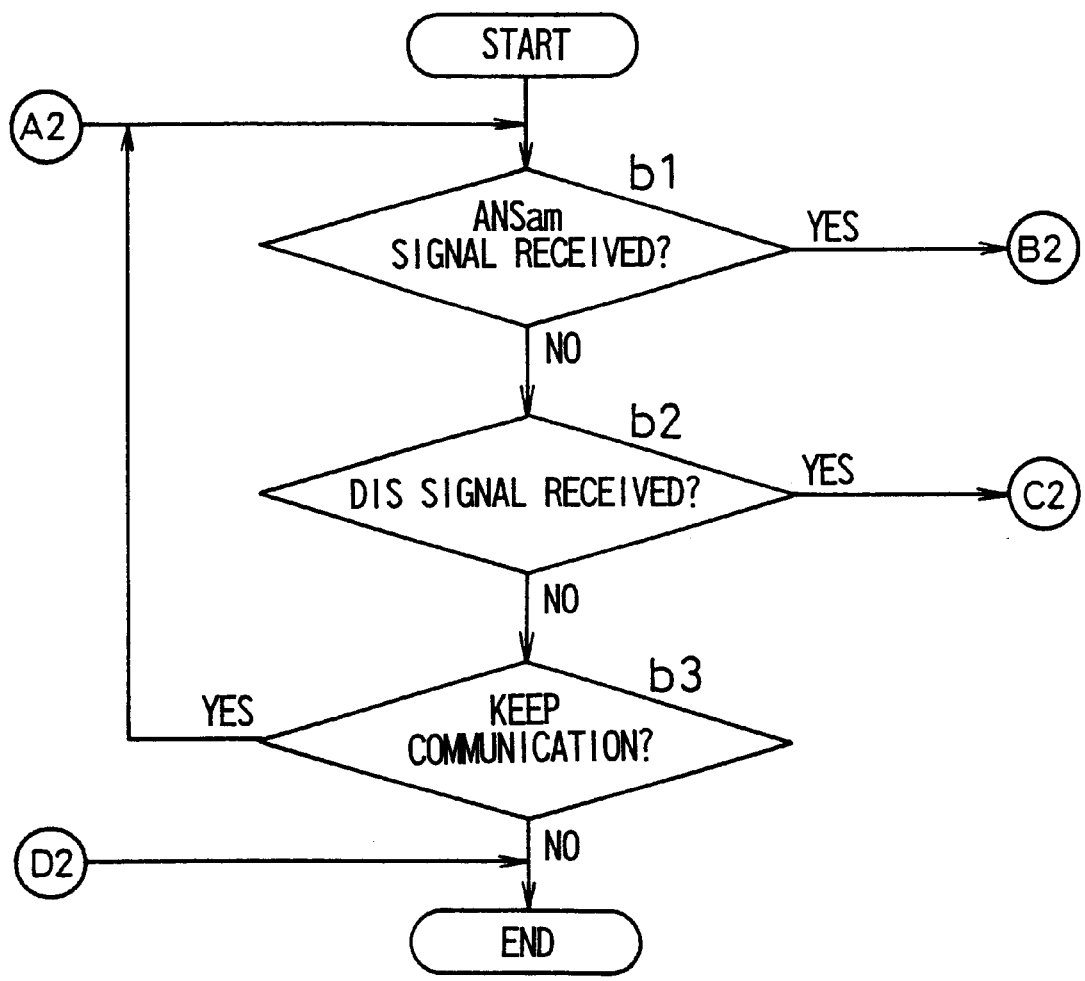
FIG. 8 is a flowchart for explaining the communication operation of the communication apparatus 1 serving as a calling station.
Figure 9:
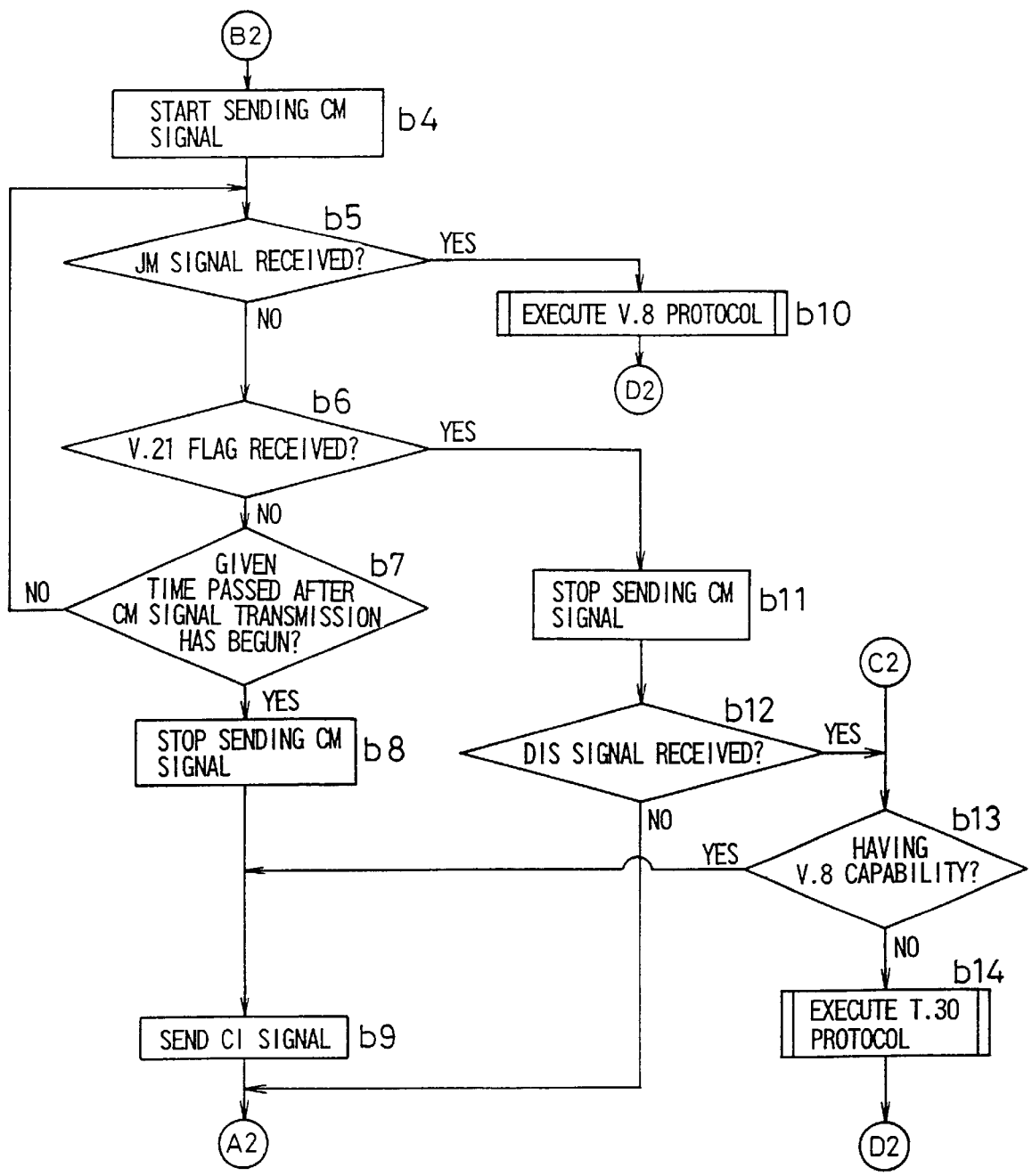
FIG. 9 is a flowchart for explaining the communication operation of the communication apparatus 1 serving as a calling station.

FIGS. 8 and 9 are flowcharts for explaining the communication operation of the communication apparatus 1 serving as a calling station. In step b1 which follows the establishment of the connection of the line L between the communication apparatus 1 and a destination communication apparatus, it is determined if the communication apparatus 1 has received the ANSam signal. The flow proceeds to step b4 when the ANSam signal has been received, and the flow goes to step b2 when the ANSam signal has not been received yet. In step b2, it is determined if the communication apparatus 1 has received the DIS. The flow proceeds to step b13 when the DIS has been received, and the flow goes to step b3 when the DIS has not been received yet. In step b3, it is determined if the communication should continue. Should the communication be maintained, the flow returns to step b1. If the communication is to be disconnected, the communication operation is terminated.

In step b4, transmission of the CM signal starts after which the flow goes to step b5. It should be noted that in step b4, after transmission of the CM signal has begun, the timer 6 measures the CM signal transmission time t4. In step b5, it is determined if the JM signal has been received. When the JM signal has been received, the flow proceeds to step b10 to execute the protocol of Recommendation V.8 after which the communication operation will be terminated. When the JM signal has not been received yet, the flow proceeds to step b6 where it is determined if the signal (flag) of the V.21 channel 2 has been received. The flow goes to step b11 when this signal has been received, and goes to step b7 when the signal has yet been received. The processes in steps b5 through b7 are repeated until the CM signal transmission time t4 elapses in step b7. When the CM signal transmission time t4 passes, the flow proceeds to step b8 to interrupt transmission of the CM signal after which the flow goes to step b9. In step b9, the CI signal is transmitted out after which the flow returns to step b1.

In step b11, transmission of the CM signal is interrupted after which the flow moves to step b12. In step b12, it is determined if the DIS has been received. The flow proceeds to step b13 when the DIS has been received, and returns to step b1 when the DIS has not been received yet. In step b13, it is determined if the destination apparatus as the called station has the V.8 capability. When the destination apparatus has such a function, the flow returns to step b9. When the destination apparatus does not have the function, on the other hand, the flow proceeds to step b14 to execute the protocol of Recommendation T.30 after which the communication operation will be terminated.

Figure 10:
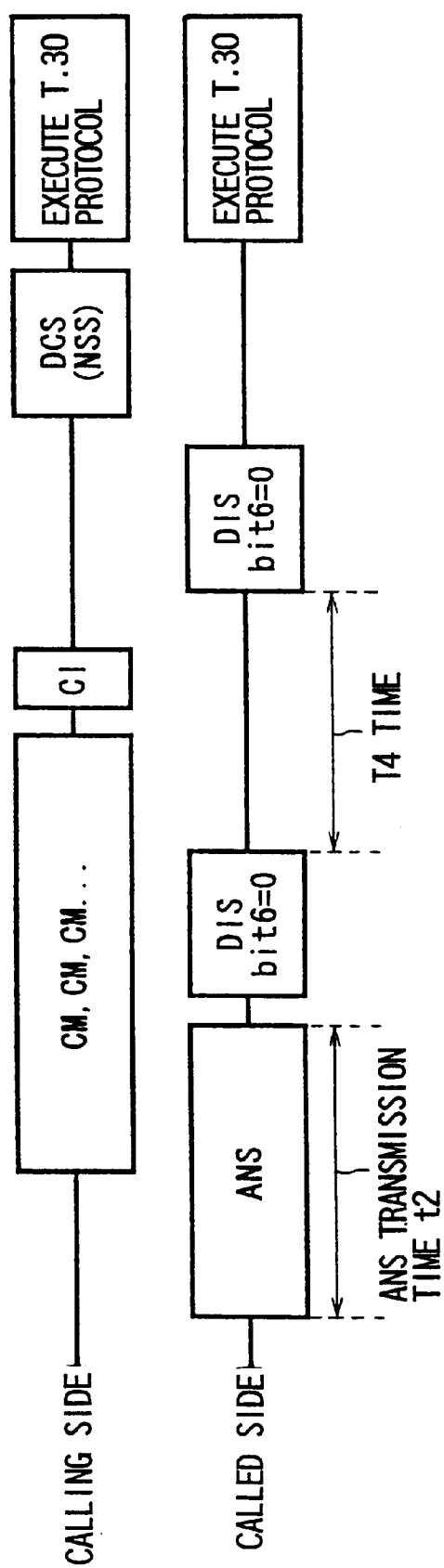
FIG. 10 is a diagram exemplifying a protocol signal when the communication apparatus 1 as a calling station communicates with a called station which cannot communicate according to the protocol of Recommendation V.8.

FIG. 10 is a diagram exemplifying a protocol signal when the communication apparatus 1 as a calling station communicates with a called station which is unable to communicate according to the protocol of Recommendation V.8. When the communication apparatus 1 receives the ANS signal transmitted from the called station and mistakes this signal for the ANSam signal, the communication apparatus 1 transmits the CM signal. Although the CM signal is kept transmitted out until reception of the JM signal, the called station does not transmit the JM signal so that the CM signal transmission time t4 will elapse. As a result, the communication apparatus 1 interrupts transmission of the CM signal and transmits the CI signal. The called station transmits the DIS with bit 6 reset, after having transmitted the ANS signal for the ANS transmission time t2. Upon reception of the DIS, the communication apparatus 1 acknowledges that the called station has no V.8 capability, and thus executes the protocol of Recommendation T.30.

Figure 11:
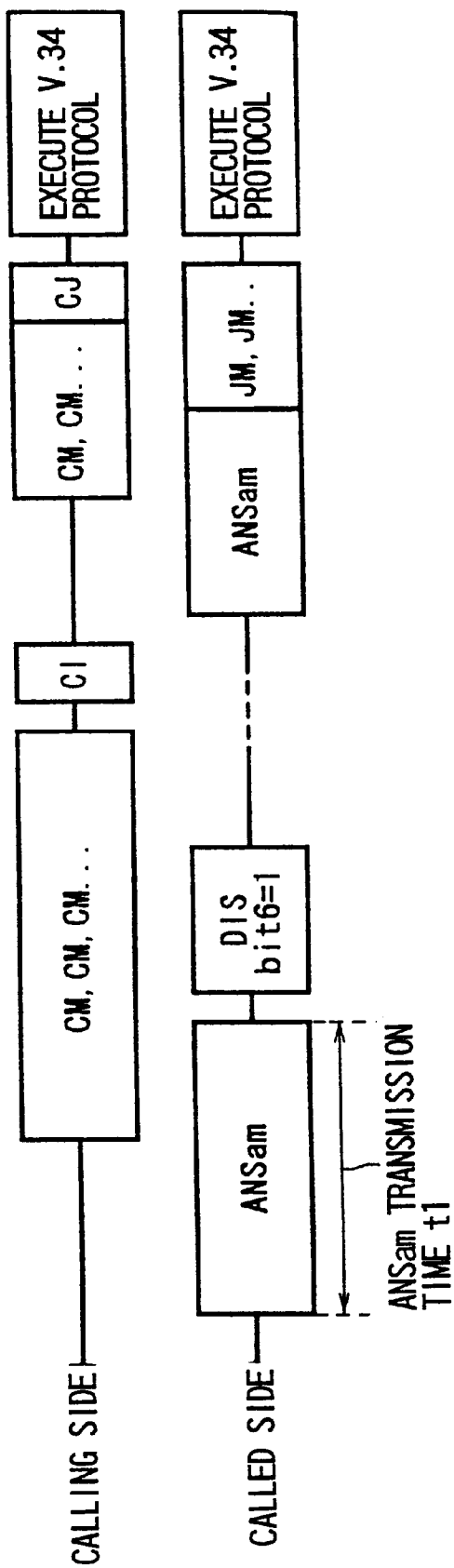
FIG. 11 is a diagram showing an example of a protocol signal when the communication apparatus 1 as a calling station communicates with a called station which can communicate according to the protocol of Recommendation V.8.

FIG. 11 is a diagram showing an example of a protocol signal when the communication apparatus 1 as a calling station communicates with a called station which is able to communicate according to the protocol of Recommendation V.8. When the communication apparatus 1 receives the ANSam signal transmitted from the called station, the communication apparatus 1 transmits the CM signal. When the called station does not receive the CM signal and thus transmits no JM signal, the CM signal transmission time t4 elapses. Consequently, the communication apparatus 1 interrupts transmission of the CM signal and transmits the CI signal. The called station transmits the DIS with bit 6 set, after transmitting the ANSam signal for the ANSam transmission time t1. When receiving the DIS, the communication apparatus 1 transmits the CI signal, upon reception of which the called station retransmits the ANSam signal. Upon reception of the ANSam signal, the communication apparatus 1 transmits the CM signal. The called station transmits the JM signal upon reception of the CM signal. The communication apparatus 1 receives the JM signal, and thus redoes the protocol of Recommendation V.8 and executes the protocol of Recommendation V.34.

Figure 12:
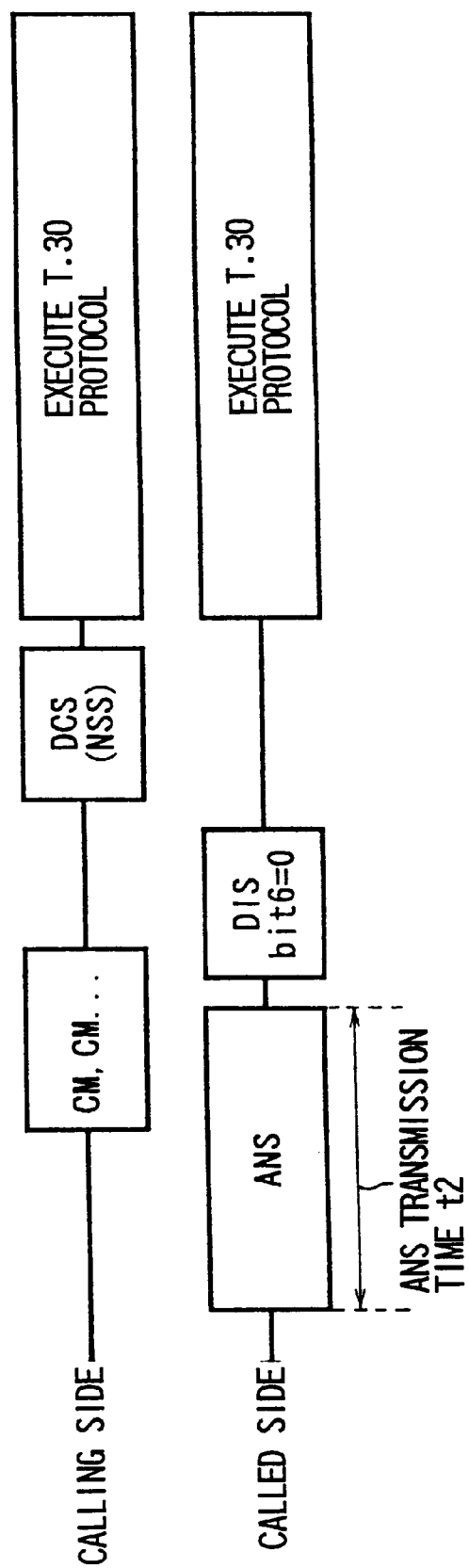
FIG. 12 is a diagram depicting another example of a protocol signal when the communication apparatus 1 as a calling station communicates with a called station which cannot communicate according to the protocol of Recommendation V.8.
Figure 13:
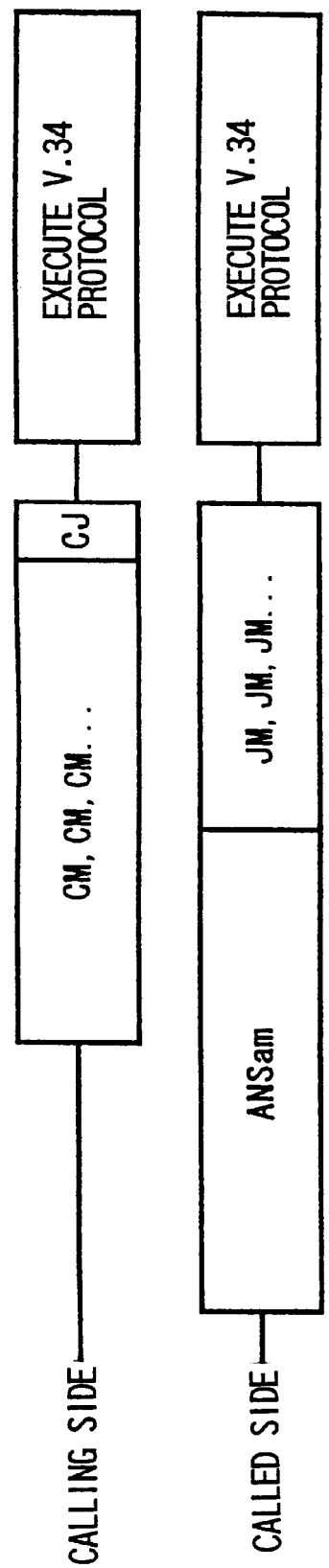
FIG. 13 is a diagram showing a protocol signal in a communication apparatus according to first prior art.
Figure 14:
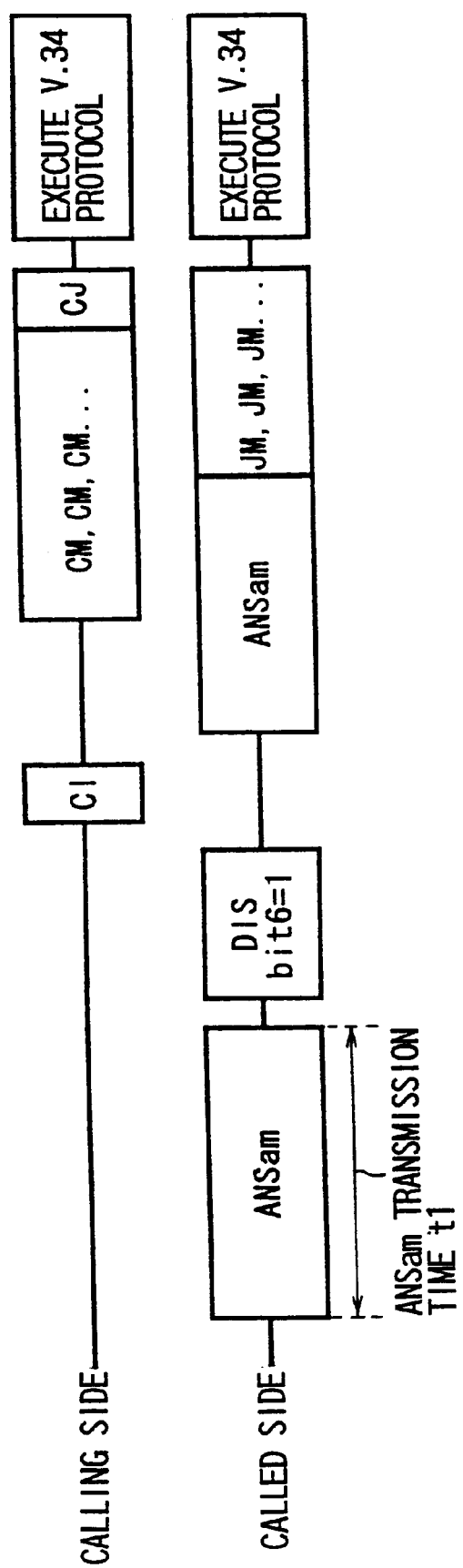
FIG. 14 is a diagram showing a protocol signal in a communication apparatus according to second prior art.
Figure 15:
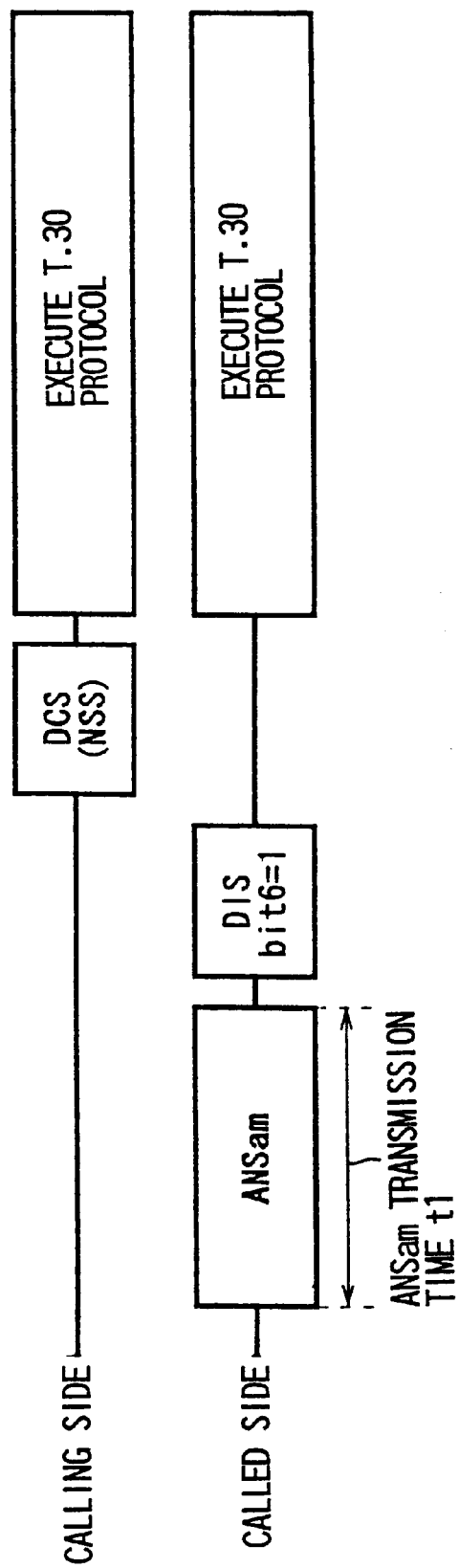
FIG. 15 is a diagram showing a protocol signal in a communication apparatus according to third prior art.
Figure 16:
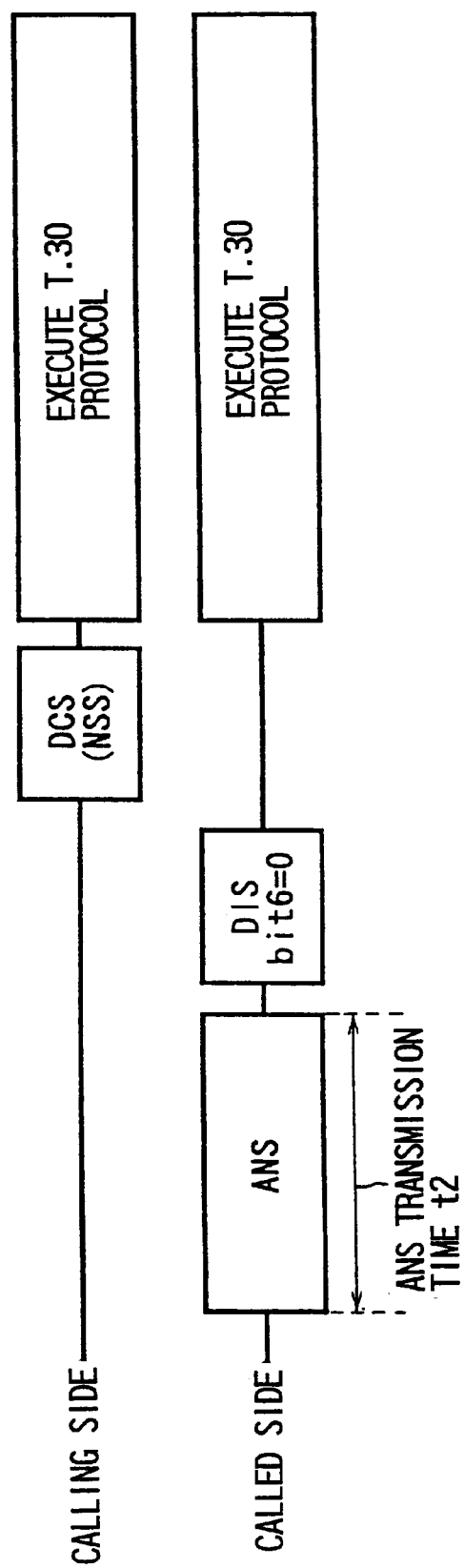
FIG. 16 is a diagram showing a protocol signal in a communication apparatus according to fourth prior art.
Figure 17:
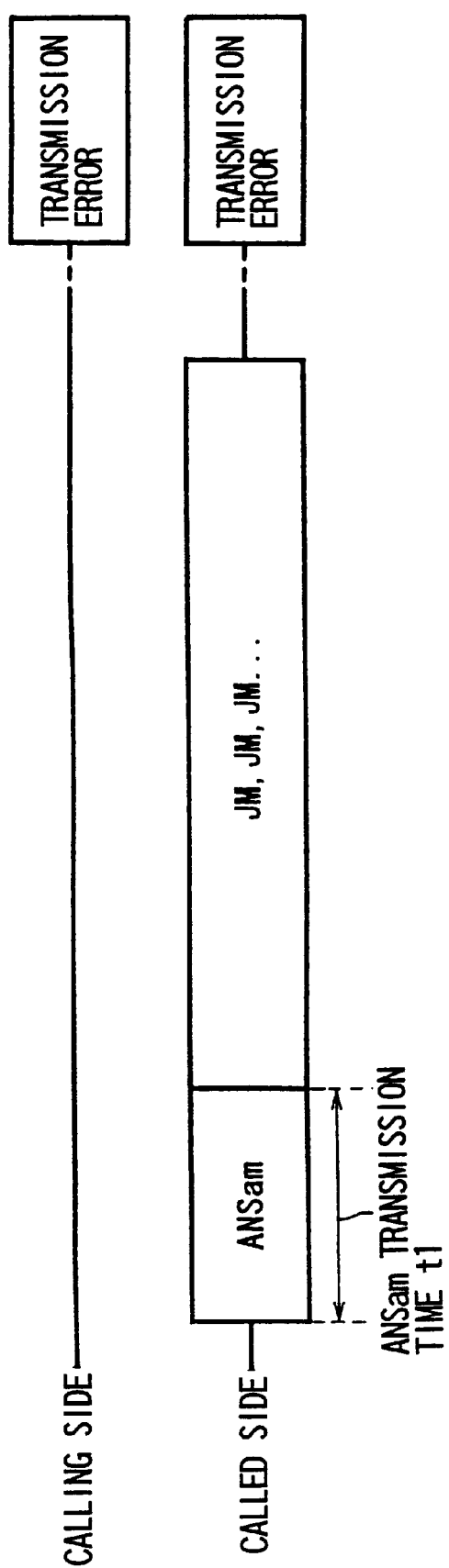
FIG. 17 is a diagram depicting a protocol signal for the conventional communication apparatuses when a communication error occurs.
Figure 18:
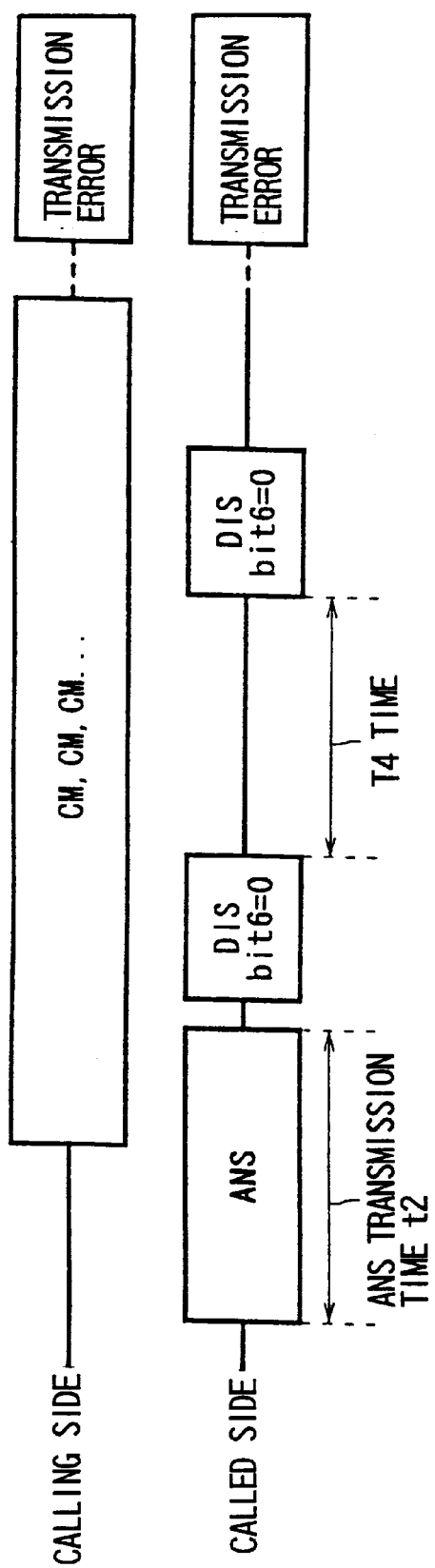
FIG. 18 is a diagram illustrating a protocol signal for the conventional communication apparatuses when another communication error occurs.

FIG. 12 is a diagram depicting another example of a protocol signal when the communication apparatus 1 as a calling station communicates with a called station which is unable to communicate according to the protocol of Recommendation V.8. When the communication apparatus 1 receives the ANS signal transmitted from the called station and mistakes this signal for the ANSam signal, the communication apparatus 1 transmits the CM signal. The called station transmits the DIS with bit 6 reset following the transmission of the ANS signal for the ANS transmission time t2. When the communication apparatus 1 detects a signal of the V.21 channel 2 within the CM signal transmission time t4, therefore, the communication apparatus 1 interrupts transmission of the CM signal, receives the detected signal and understands that the called station has no V.8 capability. Thereafter, the communication apparatus 1 executes the protocol of Recommendation T.30.

It is therefore possible to prevent a communication error, which would otherwise be caused by the continuous transmission of the CM signal, to thereby ensure transmission and reception of desired data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for preventing a communication error at a called station capable of communicating according to protocols of Recommendations T.30, V.8, and V.34 of the ITU-T, comprising:

sending a first ANSam signal from the called station to a calling station, said first ANSam signal being sent for a predetermined transmission period;

waiting to receive a first CM signal from the calling station within the predetermined transmission period;

transmitting a DIS signal having bit number 6 set to the calling station if the first CM signal is not received within the predetermined transmission period;

receiving one of a DCS signal and an NSS signal from the calling station;

receiving a CI signal from the calling station;

sending a second ANSam signal to the calling station;

receiving a second CM signal from the calling station;

sending a JM signal to the calling station;

executing communication with the calling station in accordance with the V.34 protocol after reception of a CJ signal from the calling station, wherein the preceding steps are accomplished after transmitting a DIS signal having bit number 6 set and before receiving either the DCS signal or the NSS signal from the calling station, and executing communication with the calling station in accordance with the T.30 protocol after reception of either of the DCS or NSS signals from the calling station.

2. A method for preventing a communication error at a called station capable of communicating according to protocols of Recommendations T.30, V.8, and V.34 of the ITU-T, comprising:

sending a first ANSam signal from the called station to a calling station, said first ANSam signal being sent for a predetermined transmission period;

waiting to receive a first CM signal from the calling station within the predetermined transmission period;

transmitting a DIS signal having bit number 6 set to the calling station if the first CM signal is not received within the predetermined transmission period;

receiving one of a DCS signal and an NSS signal from the calling station;

receiving a CM signal from the calling station;

sending a JM signal to the calling station;

executing communication with the calling station in accordance with the V.34 protocol after reception of a CJ signal from the calling station, wherein the preceding steps are accomplished after transmitting a DIS signal having bit number 6 set and before receiving either the DCS signal or the NSS signal from the calling station; and executing communication with the calling station in accordance with the T.30 protocol after reception of either of the DCS or NSS signals from the calling station.

3. A method for preventing a communication error at a calling station capable of communicating according to protocols of Recommendations T.30, V.8, and V.34 of the ITU-T, comprising:

sending a first CM signal to the called station after receiving a first ANSam signal from the called station;

executing communication with the called station in accordance with the V.8 protocol if a JM signal is received from the called station;

sending a CI signal from the calling station to the called station if the first ANSam signal is not received from the called station and if a DIS signal having bit number 6 set is received from the called station;

receiving a second ANSam signal from the called station;

sending a second CM signal to the called station;

executing communication with the called station in accordance with the T.30 protocol if the first ANSam signal is not received from the called station and if a DIS signal without bit number 6 set is received from the called station; and executing communication with the called station in accordance with the V.8 protocol if the JM signal is received from the called station.

4. A method for preventing a communication error at a calling station capable of communicating according to protocols of Recommendations T.30, V.8, and V.34 of the ITU-T, comprising:

sending a first CM signal to the called station after receiving a first ANSam signal from the called station;

executing communication with the called station in accordance with the V.8 protocol if a JM signal is received from the called station;

executing communication with the called station in accordance with the T.30 protocol if the first ANSam signal is not received from the called station and if a DIS signal without bit number 6 set is received from the called station;

stopping transmission of the first CM signal to the called station after receiving a V.21 channel 2 signal from the called station;

receiving a DIS signal;

executing communication with the called station in accordance with the T.30 protocol if the DIS signal does not have bit number 6 set; and executing communication with the called station in accordance with the V.8 protocol if the DIS signal has bit 6 set.

* * * * *